United States Patent [19]

Kimura

[11] 4,318,228
[45] Mar. 9, 1982

[54] LEVELING POLE

[76] Inventor: Shinhichi Kimura, 2-11, Kita, 4-chome, Imazu, Tsurumi-ku, Osaka, Japan

[21] Appl. No.: 44,091

[22] Filed: May 31, 1979

Related U.S. Application Data

[63] Continuation of Ser. No. 916,854, Jun. 19, 1978, abandoned.

[51] Int. Cl.³ .............................................. G01B 3/08
[52] U.S. Cl. .................................................... 33/161
[58] Field of Search ..................... 33/107 R, 161, 296; 403/109

[56] References Cited

U.S. PATENT DOCUMENTS

| | | | |
|---|---|---|---|
| 1,299,627 | 4/1919 | Simon | 33/161 |
| 3,239,255 | 3/1966 | Murcott | 403/109 |
| 3,526,040 | 9/1970 | Young | 33/161 |

FOREIGN PATENT DOCUMENTS

| | | | |
|---|---|---|---|
| 443247 | 12/1948 | Italy | 33/161 |
| 13617 | of 1903 | United Kingdom | 33/161 |
| 584546 | 1/1947 | United Kingdom | 33/161 |

*Primary Examiner*—Richard R. Stearns
*Attorney, Agent, or Firm*—Moonray Kojima

[57] ABSTRACT

A leveling pole comprising elliptic liners that stay immovable radially to each other and, when fully extended, form a wide-angle surface area in the axial direction to provide same-size graduations marked through the full length of the pole. The invention further involves a double engagement made by a locking button to selectively regulate the telescopical slide of each liner thereby to provide a desired measuring standard.

1 Claim, 6 Drawing Figures

U.S. Patent   Mar. 9, 1982   Sheet 1 of 2   4,318,228
FIG.1
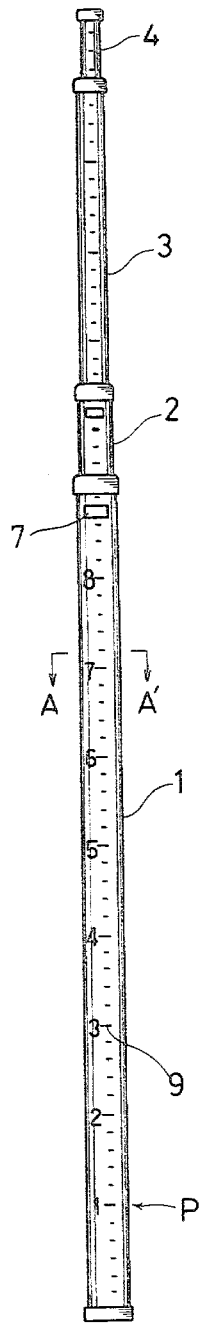
FIG.2
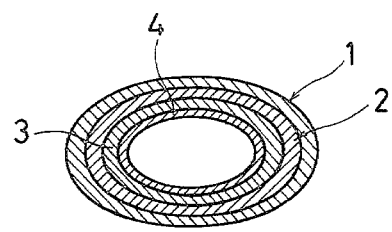
FIG.3 FIG.4
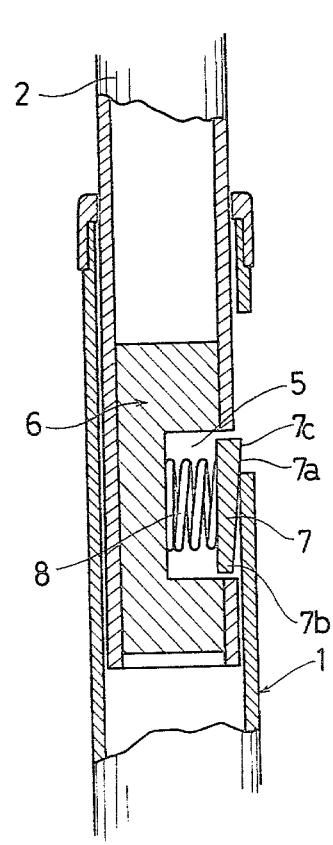
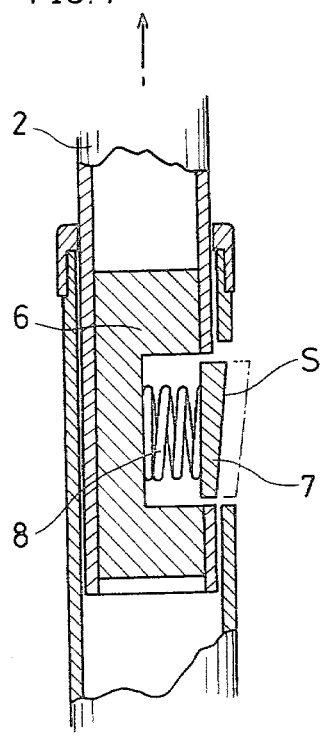

LEVELING POLE

This is a continuation of application Ser. No. 916,854, filed 6/19/78 and now abandoned.

BACKGROUND OF THE INVENTION

The present invention relates generally to improvements in a leveling pole and more particularly to an improved type measuring rod or surveying pole formed with a plurality of liner members telescopically slidable within each other and having an elliptic cross section.

Most of the conventional leveling poles in general use for determining a distance or measuring the height of trees are formed to make either a true circular cross sectional shape or a square cross sectional shape.

Referring to the aforesaid circular cross sectional leveling poles, however, they are so constructed that the inner liner members thereof are concentrically smaller in diameter than an outer liner member to form a smaller outer peripheral surface area one by one. Thus graduations must be marked in each different position on the peripheral surface area of the liner members so as to enable a user to read all the marked graduations with equal facility. This results in the marking of graduations being positionally restricted to a considerable extent and that, when viewed at a distance, all the marked graduations cannot always be confirmed with certainty, causing misreading more often than not. Further a particular mechanism is necessary to prevent each liner member from radially moving so as to always keep the marked graduations of liner members in an axially aligned position when the members are fully extended.

In the meanwhile, the aforesaid square cross sectional leveling poles are also disadvantageous in that when a single one of the liner members gets deformed, as it happens very often, by dirt of external pressure or impact, all the liner members become difficult to telescopically slide with respect to each other, giving rise to a hindrance to the smooth operation and easy conveyance of the leveling pole.

Further according to the above-mentioned circular or square cross sectioned shape leveling poles, each liner member is provided in its one end with an interlockingly engageable stopper or locking button means for restrictively regulating the range wherein the members are slidable with respect to the other so that when extended one by one, they can always keep their respective determined length until at last all the liner members are fully extended to provide a determined full length of the leveling pole.

However, the prior stopper or locking means must be provided by forming an annular groove or a concave portion on the inner periphery of one end of an inner liner member and further forming a corresponding annular projection or convex portion on the outer periphery of one end of an outer liner member, thus bringing about disadvantages that they are technically very difficult to provide, and even if provided, too easily worn away to stand long use.

Further in case of extending the liner members provided with said locking button means, they cannot be positively engaged with each other without completely rushing the means into a hole engraved on an outer liner member.

STATEMENT OF OBJECTS

Accordingly, the present invention has been designed to eliminate or mitigate all the above-mentioned drawbacks and disadvantages of the conventional leveling poles, and has as one of its main objects the provision of an elliptic cross sectioned leveling pole comprising an outer liner member and a plurality of inner liner members inserted therein in telescopically slidable relation to each other, each of said inner liner members being provided in the inner lower portion thereof with a spring mount for receiving a locking button means ready to be resiliently pushed out of the member by means of a spring in a manner that when all the inner liner members are fully extended from the outer liner member, said locking button means is plunged into a hole engraved in adjacency to each upper portion of said outer and inner liner members thereby restrictively regulating the maximum extensible length of each liner member.

BRIEF DESCRIPTION OF THE DRAWINGS

How the foregoing objects and advantages are attained will appear more fully from the following description referring to the accompanying drawings, in which:

FIG. 1 is a perspective view showing an illustrative leveling pole embodied in accordance with the present invention;

FIG. 2 is a transverse cross section taken on the line A-A' of FIG. 1;

FIG. 3 is a vertical section showing engageable portions of the invention;

FIG. 4 is a view showing how the engageable portions function;

DESCRIPTION OF INVENTION IN RELATION TO DRAWINGS

Figure 5:
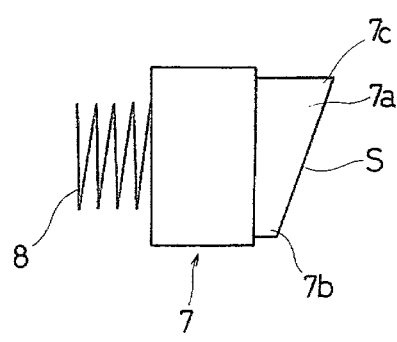
FIG. 5 is an enlarged vertical section showing elemental parts of a locking button means composing the engageable portion.

Setting forth now in detail a few preferred embodiments of the present invention with reference to the accompanying drawings, reference numeral 1 designates a hollow elliptic cylinder or an outermost liner member formed into such an elliptic shape that supposing the long axis thereof is 2$a$ long and the short axis is 2$b$ long, then $b/a$ ranges from Tan 45 to Tan 25 or $a/b$ ranges from Sin 45 to Sin 25. Into said outermost liner member 1 there are telescopically inserted a plurality of inner liner members in regular decreasing size sequence in their respective elliptical cross sectioned surface area such for example as shown by numerals 2, 3 and 4 in FIGS. 1 and 2 of the accompanying drawings.

Further both the outermost liner member 1 and the inner liner members 2 to 4 are bored internally in their respective upper edge portion with an engaging hole 5 as shown in FIGS. 3 and 4. Said inner liner members 2 to 4 are provided adjacent to the lower edge thereof with a spring mount 6 from which a locking button 7 is resiliently projected in the direction traversing the axis of each member by means of a coil spring 8.

Figure 6:
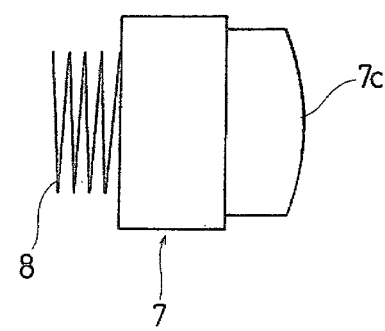
FIG. 6 is an enlarged cross section of the locking button means.

Incidentally, said locking button 7 has its upper portion 7$a$ slightly thickened and its lower portion 7$b$ thinned with its outer surface curved in conformity with the circumferential portion of each outer liner member as shown in FIG. 6 thereby being downwardly inclined as a whole to form a slow slope S as shown in FIGS. 3 to 5 inclusive, and having laterally rectangular surface area.

Both the outermost liner member 1 and the inner liner members 2 to 4 are marked through the full length thereof with suitable graduations 9 aligned in axial direction.

Therefore, according to the leveling pole P of the present invention constructed in the above-mentioned manner, said locking button 7 is so adapted as to be resiliently plunged into the engaging hole 5 by means of the coil spring 8 each time said inner liner members 2 to 4 are extended one by one from the outmost liner member 1. In this case, however, an angular extremity 7c of said thickened upper portion 7a is firstly brought into engagement with the hole 5 exposedly to the outside thereof and then other whole portion of the locking button 7 is plunged fully into the hole 5 so that the locking button 7 can be tightly interlocked with the hole 5 of a following smaller inner liner member 2, 3 or 4.

According to the present invention, therefore, it will be clearly understood that when each liner member is pulled out, the uppermost edge portion only of the locking button 7 is at first guided automatically into the hole 5 before the whole body of the button is allowed to plunge thereinto in contrast to the conventional leveling poles that are adapted to have their locking means fully engage with a hole at a single plunge, thus excessively reducing the frictional abutment of the locking button 7 against the hole 5 and further enabling the same button to be guided into the hole even if the former is plunged slightly out of the hole under the influence of a small impact that might be caused in the event of said frictional abutment.

Further it will also be understood that due to the elliptic cross sectioned shape of the liner members, the leveling pole P of the invention would not be so easily rolled over the flat surface of the ground or an object whereon it is used or provisionally left ready for use, as is often seen in the conventional circular cross sectioned leveling poles.

In the above-mentioned embodiment of the invention, description has been made only of the leveling pole P including four pieces of the outermost liner member 1 and the inner liner members 2 to 4. However, a greater number of inner liner members may be used as occasions need since the leveling pole P of the invention is made of very thin and light fiberglass reinforced plastics so that the inmost liner member is internally spatial enough to receive a further number of smaller diameter liner members, as desired.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A leveling pole having a top portion and a bottom portion, comprising an outermost hollow elliptical cylinder made of fiberglass reinforced plastic and a plurality of inner hollow elliptical cylinders each made of fiberglass reinforced plastic and inserted slidably with respect to each other, wherein said inner cylinders have a lower portion provided internally with an engaging means, said outermost cylinder and said inner cylinders, except the innermost cylinder, having an upper portion bored with a single through hole with which said engaging means is engagable whereby said pole is radially and axially regulated when fully extended;
    wherein said through hole is bored in the upper portion of each of said outermost cylinder and said inner cylinders, except the inner most cylinder;
    wherein said engaging means comprises for each inner cylinder a spring mount rigidly fixed to the lower portion of each inner cylinder, a coil spring having one end thereof rigidly fixed to said spring mount and extending across the longitudinal axis of said leveling pole, a single locking button means movable in a substantially straight line direction transverse to said longitudinal axis of said leveling pole and associated with each said through hole and having an upper thick portion and a lower thin portion to form a slow slope in vertical section and a curved cross section to conform with the circumferential shape of each outer cylinder, and the thick portion being disposed toward the top of said leveling pole, and having an uppermost angular edge and being connected to the other end of said coil spring, and normally held against said coil spring internally of said inner cylinder, whereby first frictional engagement of said locking button means with said through hole and away from the cylinder surface having graduations thereon is automatically effected by the transverse plunging action of said uppermost angular edge into said hole by resilient action of said coil spring when said cylinder is extended, and whereby second locking engagement of said locking button means with said through hole is automatically effected under the guidance of said uppermost angular edge by further resilient action of said coil spring when said cylinders are extend through their full length,
    whereby said button means extends through said through hole of the outer cylinder; and whereby retracting of the cylinder is effected by manual pushing of the button means against the resilient force of said coil spring until the thick portion is below the outer cylinder;
    wherein a peripheral surface area is formed at one side centrally including the short axis of the elliptical cross section of each cylinder, and
    wherein graduations are scaled up axially along the center of said peripheral surface area of said outermost cylinder, and graduations having the same size as said graduations on said outermost cylinder, are scaled along the center of said peripheral surface of said inner cylinders, whereby a determined total length is indicated by the same size graduations when the inner cylinders are fully extended.

* * * * *